United States Patent [19]

Arciszewski et al.

[11] Patent Number: 5,066,499

[45] Date of Patent: Nov. 19, 1991

[54] PROCESS FOR MAKING LOW SODIUM CRACKERS AND PRODUCTS OBTAINED THEREBY

[75] Inventors: Henry E. Arciszewski, Franklin Lakes; Linda A. Porzio, Kinnelon; Bin Y. Chiang, Cedar Knolls; Clyde E. Spotts, Jr., Ridgewood; Kevin McHugh, Oakland; Joseph A. Szwerc, Mahwah, all of N.J.

[73] Assignee: Nabisco Brands, Inc., Parsippany, N.J.

[21] Appl. No.: 327,709

[22] Filed: Mar. 23, 1989

Related U.S. Application Data

[60] Division of Ser. No. 105,975, Oct. 6, 1987, Pat. No. 4,859,473, which is a continuation of Ser. No. 773,127, Sep. 6, 1985, abandoned, and a continuation-in-part of Ser. No. 584,868, Feb. 29, 1984, abandoned, which is a continuation-in-part of Ser. No. 480,431, Mar. 30, 1983, abandoned.

[51] Int. Cl.$^5$ .......................... A21D 8/00; A21D 8/04; A21D 8/02

[52] U.S. Cl. ............................. 426/19; 426/21; 426/52; 426/62; 426/551; 426/553; 426/804; 426/560; 426/554; 426/94

[58] Field of Search .................... 426/19, 20, 21, 26, 426/27, 62, 551, 552, 553, 560–563, 649, 804, 561, 555, 52, 94

[56] References Cited

U.S. PATENT DOCUMENTS

| | | | |
|---|---|---|---|
| Re. 2,597 | 5/1867 | Horsford | 426/551 |
| Re. 2,979 | 5/1867 | Horsford | 426/563 |
| 14,722 | 4/1856 | Horsfor | 426/563 |
| 96,994 | 11/1869 | Stowell | 426/551 |
| 150,844 | 5/1874 | Eastwick et al. | 426/551 |
| 174,890 | 3/1876 | Arnois | 426/562 |
| 235,615 | 12/1880 | Avery | 426/562 |
| 315,830 | 7/1885 | Peters | 426/562 |
| 315,831 | 7/1885 | Peters | 426/563 |
| 315,832 | 7/1885 | Peters | 426/562 |
| 317,821 | 5/1885 | McConald | 426/551 |
| 328,364 | 10/1885 | Underwood | 426/562 |
| 331,541 | 12/1885 | Peters | 426/563 |
| 331,542 | 12/1885 | Peters | 426/562 |
| 335,214 | 2/1886 | Cobb | 33/164 D |
| 422,464 | 3/1890 | Thatcher | 426/562 |
| 673,057 | 4/1901 | Kochs | 426/563 |
| 1,428,628 | 9/1922 | Grelck | 426/551 |
| 1,450,865 | 4/1923 | Pelc | 252/183.13 |
| 1,633,872 | 6/1927 | Rippey | 426/26 |
| 1,803,588 | 5/1931 | Blank | 426/20 |
| 1,865,938 | 7/1932 | McCabe | 150/123 |
| 1,913,044 | 6/1933 | Sasse | 426/549 |
| 2,032,442 | 3/1936 | Schultz | 426/26 |
| 2,033,099 | 3/1936 | Hanley | 427/373 |
| 2,070,922 | 2/1937 | Reichert | 426/551 |
| 2,137,027 | 11/1938 | Pollack | 426/48 |
| 2,228,729 | 1/1941 | Pean | 426/551 |
| 2,288,118 | 6/1942 | Vaupel | 426/551 |
| 2,394,791 | 2/1946 | Lloyd | 426/552 |
| 2,601,112 | 6/1952 | Freedman | 426/649 |
| 2,810,650 | 10/1957 | Joslin | 426/551 |
| 2,824,008 | 2/1958 | Perri | 426/649 |
| 2,970,915 | 2/1961 | Ferrari | 426/22 |
| 2,984,543 | 5/1961 | Smith | 423/268 |
| 3,108,878 | 10/1963 | Higashiuci | 426/21 |
| 3,297,449 | 1/1967 | Baker et al. | 426/551 |
| 3,490,916 | 1/1970 | Henika | 426/19 |
| 3,505,082 | 4/1970 | Miller | 426/649 |
| 3,632,355 | 1/1972 | Umina et al. | 426/551 |
| 4,044,155 | 7/1977 | Hoseney et al. | 426/62 |
| 4,137,336 | 1/1979 | Radlove | 426/555 |
| 4,185,127 | 1/1980 | Radlove | 426/555 |
| 4,216,237 | 8/1980 | Smith | 426/74 |
| 4,277,504 | 7/1981 | Radlove | 426/555 |
| 4,379,174 | 4/1983 | Radlove | 426/555 |

FOREIGN PATENT DOCUMENTS

| | | |
|---|---|---|
| 126529 | 11/1984 | European Pat. Off. . |
| 286723 | 10/1988 | European Pat. Off. . |
| 31338 | 6/1971 | France . |
| 257399 | 11/1969 | U.S.S.R. . |
| 1085 | of 1883 | United Kingdom . |
| 10122 | of 1912 | United Kingdom . |

OTHER PUBLICATIONS

Braaksma, Ueber dir Herstellung hollaendischer Fruehstueckskuchen Brot and Gebaeck, 18th Year 1964, vol. 3, pp. 41-48.

*Encyclopedia of Food Technology*, The AVI Publishing Co. Inc. Westport, CT, vol. 2, pp. 113-114 (1974).

Matz, Samuel, *Cereal Technology*, The AVI Publishing Co., Westport, CT, pp. 80-82 (1970).

Matz, Samuel, *Cookie & Cracker Technology*, The AVI Publishing Co., Westport, CT, pp. 137-142 and 77 (1968).

*Food Materials & Equipment*, p. 18 (Mar. 1946).

*American Cookery*, Amelia Simmons, Buck Hill Associates, Johnsburg, NY, pp. 30-31 (1966).

*Primary Examiner*—Marianne Cintins

[57] ABSTRACT

Low sodium baked goods, such as soda crackers, oyster crackers, pretzels, and flavored snack crackers, having a substantially uniform texture and pH throughout, a substantially uniform surface color, a pleasant mouth feel and taste are obtained by the process of the present invention. The sodium content of the baked goods is reduced, for example, to less than or equal to 42 mg Na+per 14.2 gm serving, by replacing at least a part, preferably all, of the sodium bicarbonate with potassium carbonate for leavening. Hot spots resulting from localized concentrations of potassium ion are avoided by: 1) applying the potassium carbonate substantially uniformly and directly upon the surface of the other ingredients to hydrate and solubilize the potassium carbonate and/or 2) using potassium carbonate having a particle size distribution of about 98% by weight being finer than 100 mesh or 3) using an aqueous solution of potassium carbonate. A preferred leavening agent for use in preparing low-sodium unfermented crackers uses a mixture of 1.3 to 8 parts of ammonium carbonate and one part by weight of potassium carbonate.

35 Claims, No Drawings

PROCESS FOR MAKING LOW SODIUM CRACKERS AND PRODUCTS OBTAINED THEREBY

RELATED APPLICATIONS

This application is a divisional of application Ser. No. 07/105,975, filed Oct. 6, 1987, now U.S. Pat. No. 4,859,473 which is a continuation of application Ser. No. 773,127, filed Sept. 6, 1985, now abandoned and a continuation-in-part of application Ser. No. 584,868, filed Feb. 29, 1984, now abandoned; which is a continuation-in-part of application Ser. No. 480,431, filed Mar. 30, 1983, now abandoned.

BACKGROUND OF THE INVENTION

1. Field of the Invention

This invention relates to the production of baked goods, especially crackers and cookies, having a low sodium content. This invention also relates to low sodium cookies and low sodium crackers, such as soda crackers.

2. Description of the Prior Art

As described in the aforementioned application Ser. No. 584,868, in the production of sponge goods, such as soda crackers, sodium bicarbonate serves a dual function of: 1) neutralizing the acids produced by fermentation in production of the sponge and, 2) leavening the sponge-good dough prior to and during baking. The yeast-leavened sponge contains a considerable amount of acid which is developed by the yeast and by bacteria during fermentation. Sponge formation is followed by production of the sponge-good dough. The acid in the sponge is neutralized by adding sodium bicarbonate when the dough stage is mixed.

The production of soda crackers by this method is disclosed in U.S. Pat. Nos. 1,803,588 and 2,288,118 and in Johnson et al, *Encyclopedia of Food Technology*, The AVI Publishing Company, Inc., Westport, Conn., Vol. 2, pages 113-114 (1974), and by Matz, Samuel in *Cereal Technology*, The AVI Publishing Company, Inc., Westport, Conn., pages 80-82 (1970), and in Matz, *Cookie and Cracker Technology*, The AVI Publishing Company, Inc., Westport, Conn., pages 137-142 (1968). A soda cracker produced by this method typically contains about 194 mg total sodium per 14.2 gm serving. About 20 to 25% of this total sodium is due to the use of sodium bicarbonate. Medically, it is considered essential that persons suffering from vascular diseases, coronary diseases, and liver diseases, be restricted to a low sodium diet.

Many compositions have been developed as a replacement for common table salt, or sodium chloride, for use in low sodium diets. Salt substitute compositions are disclosed in Reissue patent 27,981, U.S. Pat. Nos. 2,601,112, 2,824,008, and 3,505,082. In the compositions of these patents, potassium chloride is used as a replacement for sodium chloride. Other ingredients are added to mask the bitter taste of the potassium ion and to minimize caking and dusting. The beneficial effect of including potassium in the diet is taught in U.S. Pat. No. 4,216,237 and in Russian patent 257,399. In U.S. Pat. No. 4,216,237 the bitter taste of the potassium ion is masked with a water-soluble, carbohydrate foodstuff ingredient. Potassium chloride, it is disclosed, is prone to ulcerate the intestinal tract, in addition to being unpalatable. Substantially equal portions of bicarbonate, citrate, and diphosphate are used to achieve a better balance of anions more closely related to natural potassium sources. Approximately $\frac{1}{4}$ to $\frac{1}{3}$ of the potassium salt ingredient is comprised by the chloride. In Russian patent 257,399, potassium chloride is used in a two-to-one ratio with lithium chloride to improve the curing properties of dietetic bread or rolls. The taste of the products, it is disclosed, is the same as with sodium chloride and the harmful effects of sodium chloride are avoided. While replacement of sodium chloride with potassium chloride can be beneficial to the health, as indicated in these patents, it would not serve the function of neutralizing the acids produced in forming a sponge, and it would not leaven the sponge-good dough. Additionally, sodium chloride contributes flavor to a cracker or sweet good. In producing a low sodium baked good, it would be desirable to eliminate other sources of sodium to enable retention of some sodium chloride for its flavoring characteristics.

While sodium bicarbonate is the most widely used chemical leavening agent, many other compositions for producing carbon dioxide gas in foods without the use of sodium bicarbonate are known. Baking powder compositions which contain ammonium carbonate or ammonium bicarbonate are disclosed in U.S. Pat. Nos. 150,844, 174,890, 235,615, and 1,865,938. The carbonate of barium is considered to be poisonous in U.S. Pat. Nos. 331,541 and 331,542. The carbonates of calcium, magnesium and strontium are used in the baking powder compositions of the latter two patents. The carbonates of calcium are also utilized in the baking powders of U.S. Pat. Nos. 150,844 and 328,364. The carbonates of magnesium are present in the baking powders of U.S. Pat. Nos. 315,830, 315,831, 315,832, and 328,364. The carbonate or bicarbonate of potassium is present in the baking powder compositions of U.S. Pat. No. Re. 2,597, U.S. Pat. No. Re. 2,979, and U.S. Pat. Nos. 14,722, 96,994, 150,844, 174,890, 235,615, and 673,057. According to U.S. Pat. No. 235,615, the bicarbonate is preferred over the carbonate for raising bread because less lactate is required to react with the bicarbonate. In U.S. Pat. No. 422,464, it is taught that ammonium carbonate is used to prevent a baking soda comprising cream of tartar and sodium bicarbonate from becoming hard. However, according to U.S. Pat. No. 422,464, the carbonate of ammonium is considered to be objectionable as a food.

Effervescing salt compositions which utilize carbonates for producing carbon dioxide are disclosed in U.S. Pat. Nos. 1,450,865 and 2,984,543. The carbonates or bicarbonates of sodium, potassium, ammonium, calcium or magnesium may be used in the compositions of U.S. Pat. No. 1,450,865. In U.S. Pat. No. 2,984,543 the effervescing salt may contain potassium or lithium bicarbonates or calcium, magnesium, or organic carbonates. However, in these effervescing salt compositions and in the baking powder compositions, an acid is included for reaction with the bicarbonate or carbonate for producing the carbon dioxide. These compositions would be unsuitable for use in producing a sponge-good dough because they would not serve the dual function of leavening the sponge-good dough and neutralizing the acids which are produced during formation of the sponge.

The addition of an alkaline carbonate as a neutralizer and as a leavening agent for a "prepared flour" is taught in U.S. Pat. No. 1,428,628. Lactic acid which is present in sour milk or butter milk of the prepared flour is neutralized by the alkaline carbonate. Bicarbonate of soda, however, is the only carbonate disclosed in the patent.

The use of carbonates, other than sodium bicarbonate in the production of baked goods is disclosed in British patent Nos. 1,085 of 1883 and 335,214, U.S. Pat. No. 2,970,915 and as early as 1796 in *American Cookery*, by Amelia Simmons, reprint by Martin Rywell, Buck Hill Associates, Johnsburg, N.Y. 12843, pps. 30–31 (1966). The addition of iron and manganese carbonates to bread and biscuits for medicinal purposes is disclosed in British patent No. 1,085. Magnesium and/or calcium carbonates are taught as acid-neutralizing constituents in British patent 335,214 for dough or flour compositions which contain persulphates and bromates. Calcium carbonate is disclosed as a bread improver in U.S. Pat. No. 2,970,915. In *American Cookery*, recipes for honey cake and cookies include pearl ash, an impure potassium carbonate product obtained by partial purification of potash from wood ashes. Replacement of sodium bicarbonate with potassium carbonate to achieve sodium reduction in the final baked product is not taught by any of these references.

The preparation of a health bread with potassium carbonate and ammonium carbonate as a leavening agent is taught in U.S. Pat. No. 2,228,729. The potassium carbonate, it is disclosed, results in a bread which is free of greenish color or hue and possesses a fine whitish interior. The ammonium and potassium carbonates are added to a sponge which contains approximately 40% or more eggs. The large percentage of eggs, it is disclosed, creates a large expanding force upon heating thereby reducing the usual amount of chemical leavening agents needed for expansion. Although a sponge is produced, fermentation is not disclosed in the patent. Additionally, the degree of expansion needed in the production of the bread would be unacceptable in the production of crackers.

The use of alkaline carbonates, other than those of sodium, as a leavening agent or neutralizing agent in the production of baked goods, is also disclosed in U.S. Pat. Nos. 317,821, 1,913,044, 2,070,922, and 2,394,791, and in *Food Materials & Equipment*, page 18, (March 1946). Treating a sponge to neutralize its acidity, to leaven it and to obtain a low-sodium cracker is not disclosed in these references. In U.S. Pat. No. 317,821, the acid or disulfate of potash with carbonates or bicarbonates of potash is used as a replacement for tartaric acid in the production of bread, cakes, biscuits, and the like. In U.S. Pat. No. 1,913,044, a bicarbonate or carbonate of either sodium or potassium is reacted with manganese succinate to promote oxidation of the coloring matter in a bread dough. Calcium carbonate is taught as a replacement for sodium bicarbonate in the pastry industry in the *Food Materials & Equipment* article. In U.S. Pat. No. 2,070,922, hydrogen peroxide is used as a leavening agent in the production of waffles, griddle cakes, crackers, and the like. Alkaline metal carbonates are used to stabilize the hydrogen peroxide and to make the formulation alkaline at a pH of about 8 to 10. Pre-neutralization of starch for various wafer or waffle batters with calcium carbonate is taught in U.S. Pat. No. 2,394,791. The calcium carbonate replaces a portion of the sodium bicarbonate, the sodium bicarbonate being retained to obtain sufficient leavening action.

Treatment of a fermented dough with a carbonate other than sodium is disclosed in U.S. Pat. No. 2,032,442. In the process of this patent, a heat-decomposable ammonium compound, such as a carbonate of ammonium, is applied to the surface of a fermented dough. Subsequent baking releases ammonia which browns the surface of the bread, rolls, and like products. Mixing of the ammonium carbonate with the fermented dough to distribute it substantially uniformly throughout the dough to achieve neutralization of acids produced during fermentation is not disclosed.

The use of alkaline carbonates, other than sodium bicarbonate, in fermented doughs for the production of various baked goods, is disclosed in U.S. Pat. No. 2,033,099, 2,137,027, 3,108,878, and 4,044,155. In the processes of these patents the alkaline carbonate is added with the yeast and is present during fermentation. Breads, rolls, buns, and the like are produced from these yeast leavened doughs. The production of soda crackers is not disclosed. In U.S. Pat. No. 2,033,009, an alkaline salt is added to the yeast food to keep it alkaline until it reaches the fermentation stage, whether in the dough or in the sponge. Calcium carbonate or magnesium carbonate are disclosed as the preferred alkaline salts because of their slow solubility. In U.S. Pat. No. 2,137,027, a yeast sponge is buffered with ammonium carbonate or calcium or magnesium carbonates. In U.S. Pat. No. 3,108,878, a calcium carbonate buffer is added with yeast to a soy flour dough composition. In U.S. Pat. No. 4,044,155, a non-fat dry milk substitute for incorporation into yeast-leavened doughs, is prepared by mixing deproteinized whey, an ammonium compound such as ammonium carbonate or bicarbonate, and a protein supplement. A basic material, such as a carbonate or bicarbonate of sodium, potassium, calcium, or magnesium, is optionally added to control the pH of the substitute and to at least partially neutralize the deproteinized whey.

Calcium carbonate is taught as a buffering agent for a liquid yeast brew in U.S. Pat. No. 3,490,916. The brew may be used to form a yeast leavened dough, which may be a cracker or soda cracker composition. The use of calcium carbonate to neutralize the acids present in a sponge and to leaven the fermented dough is not disclosed. Furthermore, calcium carbonate is not sufficiently soluble in water to uniformly neutralize the acids in a sponge or to leaven a sponge dough substantially uniformly.

U.S. Pat. No. 1,633,872 discloses ammonium bicarbonate as a substitute for baking soda in the production of an unsalted cracker. According to U.S. Pat. No. 1,633,872, salt is added to the surface of a cracker to mask the objectionable taste resulting from the breakdown of the fat used as shortening. The rancidity is eliminated by the use of coconut oil, thereby eliminating the need for a salt topping. The use of ammonium bicarbonate instead of sodium bicarbonate as the means of raising the dough, it is disclosed, eliminates the soda flavor and improves the color of the cracker. A relatively rapid fermentation time of four to five hours is used before the ammonium bicarbonate is added to the sponge dough. Adding sufficient ammonium bicarbonate to neutralize acids produced during the fermentation is not disclosed. According to U.S. Pat. No. 1,633,872, if too large a proportion of ammonium bicarbonate is used, a yellow objectionable color develops in the cracker.

In using ammonium bicarbonate alone as a replacement for sodium bicarbonate, neutralization of acids produced during fermentation becomes a problem. As disclosed in U.S. Pat. No. 1,633,872, the ammonium bicarbonate is entirely volatilized in the baking operation. The release of both ammonia and carbon dioxide makes pH control of the final product difficult. Furthermore, it has been found that replacement of sodium bicarbonate with ammonium bicarbonate in the production of a soda cracker, does not result in a uniform laminar cell structure. Large cells and tight areas are obtained with ammonium bicarbonate. The cracker is too tender and has both flat and raised or bubbled portions. Accordingly, ammonium bicarbonate alone is not a suitable replacement for sodium bicarbonate in the production of an acceptable low sodium soda cracker.

Potassium bicarbonate has been used as a component in leavening mixtures for baked products intended to be consumed in sodium-free diets. However, as disclosed by Matz in *Cookie and Cracker Technology* (1968) at page 77, potassium bicarbonate is very hygroscopic and tends to impart a bitter flavor to the foods in which it is used. Crackers are baked to a low moisture content and their crispness gives a snap or crunch upon eating. The presence of a highly hygroscopic material in a cracker would tend to be deleterious to the achievement of these sensory properties. Additionally, potassium bicarbonate is very expensive. Matz teaches away from the use of carbonates because their very high alkalinity, compared to the alkalinity of sodium bicarbonate, tends to result in localized areas of very high alkalinity which is formed as the granules dissolve in the dough. These localized areas, it is disclosed, result in reactions which lead to undesirably colored and flavored products. In producing a laminated product, these localized areas generally appear as dark streaks in the baked product.

The present invention provides a process for the production of baked goods, especially crackers, having a crisp texture, a non-bitter taste, a pleasant mouth feel and a substantially uniform laminar cell structure without using sodium bicarbonate. Thus, substantial sodium reduction can be achieved while retaining sodium chloride for its flavoring characteristics. The baked products have a uniform brown color on their surfaces, are of substantially uniform pH throughout, and are devoid of hot-spots or dark streaks caused by localized areas of carbonate leavening agents. Unfermented crackers and sweet goods can be produced in accordance with the present invention without the need for sodium bicarbonate.

Under current Food and Drug Administration proposals, a "low sodium" baked good, which includes sponge goods, unfermented type crackers, cookies and cakes, has a sodium content of from 35 to 140 mg. $Na^+$ per serving, while a "very low sodium" baked good has a sodium content of less than or equal to 35 mg. $Na^+$ per serving. Also, a "no-sodium" baked good has a sodium content of less than or equal to 5 mg. $Na^+$ per serving. According to FDA proposed rules, products which contain not more than 20% in excess of the value stated for sodium declared in the label are considered to be properly labeled. "Very low-sodium" products and "no-sodium" products may accordingly contain up to 42 mg. per serving and up to 6 mg. per serving, respectively. The weight of a "serving" depends upon the type of baked good. As used herein, a serving is 14.2 g. (½ oz.) for crackers of the fermented and unfermented-types, 28.35 g. (1 oz.) for cookies and pretzels, and 55.4 g. for cakes. The present invention provides a process for reducing the sodium content of baked goods to a "low sodium", "very low sodium" or "no sodium" level as defined above for each type of baked good. The sodium content is based upon the final baked product (i.e., the serving) and includes sodium from topping salt (sodium chloride) as well as from salt within the final product.

SUMMARY OF THE INVENTION

The present invention relates to a process for the production of baked goods, such as soda crackers, without using sodium bicarbonate. By eliminating a substantial portion or all of the sodium bicarbonate, a larger amount of sodium chloride can be retained for the flavor or the "bite" which is characteristic of salt while achieving a lower sodium content. Reduction of the sodium chloride level and the sodium bicarbonate level can achieve a sodium content of, for example: a) less than or equal to 42 mg., preferably less than or equal to 35 mg., per 14.2 gm serving for "very low sodium products", or b) less than or equal to 6 mg., preferably less than or equal to 5 mg., per 14.2 gm serving for "no-sodium" products. Potassium carbonate, instead of sodium bicarbonate is used to leaven the dough used to produce the baked good. An amount of potassium carbonate is used which is sufficient to achieve a desired pH, in the range of about 6.5 to about 8.0, preferably 6.7 to 8.0, in the final baked product. A substantially uniform pH throughout the final product and the substantial elimination of hot-spots or dark streaks caused by localized areas of potassium carbonate can be achieved by: 1) distributing the potassium carbonate substantially uniformly and directly on the surface of the other ingredients to hydrate and solubilize substantially all of the potassium carbonate; or 2) by use of an aqueous solution of potassium carbonate. When a dough is prepared using a creaming stage and thereafter adding flour in a dough-up stage, substantial avoidance of hot spots can also be achieved by adding flour over the surface of the mixture formed in the creaming stage and then distributing potassium carbonate having a fine particle size, or by adding an aqueous solution of potassium carbonate, substantially uniformly over the flour. Crackers produced by the method of the present invention have a crisp texture, a non-bitter taste, uniform brown color on their surfaces, and a substantially uniform laminar cell structure which are characteristic of similar crackers conventionally produced using sodium bicarbonate. The products have a pleasant mouth feel. Other types of baked goods can also be produced by using potassium carbonate as a leavening agent and neutralizing agent in place of sodium bicarbonate.

This invention also provides a leavening composition for chemically leavening baked goods, especially crackers, the leavening composition comprising ammonium bicarbonate, potassium carbonate and an edible acidic component capable of reacting with the potassium carbonate to liberate carbon dioxide, the weight ratio of ammonium bicarbonate to potassium carbonate in the leavening composition being from about 1.3:1 to about 8:1 on an anhydrous basis and the acidic component providing from about 1.5 to about 3 moles of acidic hydrogen for each mole of potassium carbonate in the leavening composition. Typically, such leavening compositions will comprise from about 40 to about 80 percent by weight of ammonium bicarbonate, from about 30 to about 10 percent by weight of potassium carbonate and from about 30 to about 10 percent by weight of the acidic component, all percentages being based upon the total weight of the ammonium bicarbonate, potassium carbonate and the acidic component on an anhydrous basis. The invention also provides a process for producing a cracker using, and a dough composition incorporating, such a leavening composition.

The percentages of the components of the leavening compositions of the present invention are calculated on an anhydrous basis i.e. with the weights of all components calculated in their anhydrous forms, ignoring any water of crystallization which may be present. The components need not actually be present in their anhydrous forms; for example, the ammonium bicarbonate is conveniently used in the form of its monohydrate, while the preferred edible acidic component, calcium phosphate monobasic (discussed below) is desirably used in the form of its monohydrate.

This invention also provides a cracker baked from a dough comprising flour, water, fat or shortening, a leavening agent including potassium carbonate, and sodium chloride, the cracker having sodium chloride present as a topping on one of its surfaces, and at least about 85 (preferably at least about 90 and most desirably at least about 95) percent by weight of the sodium in the cracker, including the topping, being present as sodium chloride.

DETAILED DESCRIPTION OF THE INVENTION

Conventional formulations can be used for the production of baked goods according to the process of the present invention except that the sodium bicarbonate is replaced with potassium carbonate. Replacing all of the sodium bicarbonate with potassium carbonate allows for substantially all of the sodium content to be from sodium chloride. The sodium chloride contributes to flavor enhancement and the elimination of a bland taste to a much greater extent than does sodium bicarbonate. Thus, by using potassium carbonate to replace sodium bicarbonate in baked goods in accordance with the present invention, one can increase the proportion of sodium in the baked good which is present in the form of sodium chloride. This is especially advantageous in baked goods such as crackers, in which a salty taste is desired since it enables one to achieve a given degree of salty taste at a lower sodium content, or a greater degree of salty taste at a given sodium content. In a conventional cracker in which sodium bicarbonate is used as part of the leavening agent, the sodium bicarbonate will supply about 25 percent of the sodium in the baked cracker, and little, if any, of the sodium derived from sodium bicarbonate ends up as sodium chloride. Thus, at most, only about 75 percent of the sodium in the baked cracker is in the form of sodium chloride, whereas by replacing part or all of the sodium bicarbonate with potassium carbonate in accordance with the present invention one can achieve crackers in which at least 85 percent, and in most cases at least 90 or 95 percent of the sodium in the cracker is in the form of sodium chloride. Total replacement of sodium bicarbonate with potassium carbonate can yield crackers in which the only substantial source of sodium is sodium chloride. For example, the preferred unfermented cracker of the invention described in Example VII below contains 60 mg. of sodium ion per serving, of which 58 mg. (about 97 percent) is in the form of sodium chloride, the remaining 2 mg. being in the form of unavoidable sodium in the flour and other dough ingredients.

It has been found that, due to the higher alkalinity of potassium carbonate, if no other adjustment of a recipe is made the amount of potassium carbonate which is needed to achieve a desired pH is approximately 80% to 90% by weight of the amount of sodium bicarbonate used in a conventional formulation.

Alternatively larger amounts of potassium carbonate, in excess of about 90% by weight of the sodium bicarbonate it replaces, may be used if a food grade acidic compound is added to the dough to reduce the pH of the baked dough to within the desired range of about 6.5 to about 8.0, preferably 6.7 to 8.0. For example sodium bicarbonate may be replaced with approximately 100% of its weight of potassium carbonate, in conjunction with a food grade acidic compound. Larger amounts of potassium carbonate may be used if the amount of acidic compound is adjusted accordingly. The larger amounts of potassium carbonate may, for example, be desirable for the control of oven spring.

A convenient food grade acidic compound for use in conjunction with the potassium carbonate is calcium phosphate monobasic, preferably in the form of its monohydrate. Other food grade acidic compounds, for example fumaric acid may also be used. It will be appreciated that these or similar food grade acidic compounds are normally included in conventional chemically-leavened doughs which use sodium bicarbonate as the leavening agent. Accordingly, when sodium bicarbonate is replaced with potassium carbonate in accordance with the present invention it may only be necessary to increase the quantity of food grade acidic compound already present in the dough.

Although the amount of food grade acidic compound added (or the increase in the existing amount of acidic compound present in the dough) will of course vary with the amount of potassium carbonate used and the pH desired in the final product, in general we have found that adding a weight of the food grade acidic compound equal to from about 10 to about 50, and preferably about 20 to about 30, percent of the weight of the potassium carbonate added to the dough gives good results in the case of sponge goods.

For reasons which will be apparent to those skilled in the art, the techniques used applying the invention to sponge goods differ in some respects from those used in applying the invention to unfermented or chemically leavened goods. Accordingly, the preparations of the two types of baked goods are described separately below.

SPONGE GOODS

As already mentioned, the method of the present invention can be used to prepare sponge crackers, unfermented (chemically leavened) crackers, cookies and other baked goods. In the preparation of sponge crackers, a sponge is first formed from flour and water. The fermentation agents are yeast and bacteria. The yeast, flour, and the surfaces of the trough in which the sponge is formed serve as sources of the bacteria. It is preferable to use a starter or inoculum from a previous batch of sponge to serve as a source of yeast and bacteria. A sponge flour is typically relatively strong, unbleached, with an ash of 0.39 to 0.42%. It typically has a protein content of about 7.5 to 13.0% and an acid viscosity value in the range of about 60° to 90° M. A typical sponge is produced by combining the flour, water, yeast, and optional inoculum in a mixer, such as a spindle mixer. During fermentation, starch is converted to dextrins and fermentable sugars by amylases. Deficiencies in flour amylase can be corrected by the addition of diastatically active malt flour, such as malted barley flour, and/or a fungal diastase, and/or proteolytic enzyme.

Shortening which can be lard or vegetable shortening, for example, is preferably added to the sponge during the dough-mixing stage. However, a portion of the shortening may be used to produce the sponge. It is also preferable to add all of the water in the sponge-forming stage to avoid an extra step in the dough-forming stage. A portion may be added to the sponge in the dough-forming stage in a manner which avoids disturbing the substantially uniform distribution of the potassium carbonate.

In the production of the sponge, a buffering system may be used to compensate for water supplies which have very high pH's. Commercially available buffering systems for this purpose or commercially available yeast foods which contain buffering systems can be used.

Typical relative amounts of the ingredients used in the formation of the sponge are from about 60 to about 70% by weight wheat flour, from about 27% by weight to about 33% by weight water, from about 0.1 to about 1% by weight yeast, from 0 to 1% by weight diastatic malt or proteolytic enzyme, from about 0 to about 7% shortening, from about 0 to about 1% by weight yeast food, and from about 0 to about 2% by weight of starter or ferment. All percentages are based upon the total weight of the ingredients used to form the sponge. Known buffers can be added as needed to obtain a pH of about 5 to about 6.5 at the start of the fermentation. Various flours can be used, such as wheat, rice, graham and mixtures thereof, but wheat flour is preferred.

Fermentation times (also referred to herein as sponge times) are those conventionally used in the art. In the case of soda crackers or saltines, and the many variants of these products such as oyster (soup) crackers, club crackers, cheese crackers, and the like, sponge times of about 2 to 24 hours, are typically used. The process of the present invention can also be used in the production of sponge goods requiring shorter fermentation times or longer fermentation by replacing the sodium bicarbonate which is added in the dough-up step with potassium carbonate.

In preparing the sponge, no special order of mixing is required. Conventional processes can be used. Typically, the flour is dumped into a trough, a portion of the water containing dissolved yeast buffer is added, the remaining ingredients of the sponge are added, and then the balance of water is added. The sponge ingredients are mixed until clear to obtain substantial homogeneity. The setting temperature for the sponge is usually about 75° F. but varies from about 70° to about 80° F. depending upon several factors, chiefly the flour.

Typical dough ingredients for mixing into the fermented sponge include flour, shortening, and potassium carbonate. The addition of a minor amount of water, salt as sodium chloride, ammonium bicarbonate or calcium carbonate in the dough-up stage is optional. The calcium carbonate is added for the nutritive value of the calcium. Ammonium bicarbonate can be added to provide spring. If the levels of ammonium bicarbonate are too high, the structure of the final product becomes very irregular. Additionally, both portions of the ammonium bicarbonate volatilize making it difficult to achieve a desired pH in the final product. A minor amount of water can be used to achieve lubricity, particularly when a portion of the total amount of shortening in the biscuit formulation is used as an ingredient in making the sponge. However, it is preferable to include all of the water as an ingredient of the sponge and all of the shortening as an ingredient of the dough. The dough flour should be weaker than the sponge flour, typically with an ash of about 0.40%, and an acid viscosity reading of about 55° to 60° M. Wheat flour is preferred.

The potassium carbonate which is used in the present invention may be any food-grade potassium carbonate, anhydrous or hydrated. The potassium carbonate may be added either in dry form or as an aqueous solution. A portion of the water used in making the sponge or dough can be used to form the potassium carbonate solution. A commercially available aqueous potassium carbonate solution, such as a 47% by weight potassium carbonate solution sold by Diamond Shamrock Chemicals Company, Morristown, N.J. can also be used. The amount of water added to the sponge or dough may correspondingly be reduced.

Suitable amounts of the dough ingredients, based upon the total weight of the dough ingredients which are added to the sponge, are from about 65% to about 80% by weight of flour, from about 14% to about 29% by weight shortening, from about 0.5% to about 2.5% by weight potassium carbonate (anhydrous basis), from about 0 to about 0.5% ammonium bicarbonate, from about 0 to about 10% by weight calcium carbonate, from about 0 to about 1.2% by weight salt as sodium chloride, and from about 0 to about 5% by weight water.

The relative amounts of the total amount of sponge ingredients to the dough ingredients should be such that the weight percent of flour used to form the sponge is from about 60% to about 75% by weight of the total amount of flour which is used. Instead of including the optional salt in the dough-up stage, this salt or a portion of this salt, can be used as topping salt. The ultimate amount of salt which is used is governed by the desired serving limitation on sodium e.g., 35 mg or less sodium per serving. Additionally, the amount of potassium carbonate which is used is governed by the amount of acid produced during the fermentation stage. The above range of 0.5% to 2.5%, however, has been found to be generally suitable for obtaining the desired pH range of about 6.7 to about 8.0, and desirably 7.0 to 8.0 in the sponge goods. The precise amount needed to obtain a desired final pH can be determined by the same techniques used to determine the amount of sodium bicarbonate addition. The acidity in the sponge which must be compensated for by addition of the potassium carbonate is related in a general way to pH, and the pH readings on the dough can be used for determining the amount of potassium carbonate addition. In the pH test, measurements with temperature compensated electrodes can be taken directly on the sponges immediately prior to addition of the dough ingredients, as is known in the art. Additionally, pH tests on lumps of dough or sponge sent through the oven ahead of the batch can be used to compensate for changes which may take place in the oven. A total titratable acidity measurement on the sponge is a preferred method because it has been found to be more accurate, even though more time consuming, than the pH test. A fast, accurate method particularly suitable for monitoring production runs is to crush the baked, final product, distribute it in distilled water to form a 10% by weight slurry, and to make adjustments in the potassium carbonate level based upon the pH of the slurry.

Suitable specific sponge and dough formulations for soda crackers or sprayed crackers which can be modified in accordance with the present invention are disclosed in Matz, S., *Cereal Technology*, the AVI Publishing Company, Inc., Westport, Conn., page 138, Table 38 and page 143, Table 39 (1968) and in Johnson et al, *Encyclopedia of Food Technology*, the AVI Publishing Company, Inc., Westport, Conn., page 114, Table B7 (1974). In these formulations, in accordance with the process of the present invention, the sodium bicarbonate is replaced with potassium carbonate and the salt content is reduced so as to achieve a pH in the range of about 6.7 to 8.0, and desirably 7.0 to 8.0, and a sodium content of, for example, less than or equal to 35 mg per 14.2 gram serving.

The dough ingredients are combined with the sponge so as to avoid occurrence of hot spots due to local concentrations of the potassium carbonate. Conventionally, the flour, typically of medium and/or low strength, is first added to the surface of the sponge and then the sodium bicarbonate is added on top of the flour. This same procedure can be used for the addition of potassium carbonate provided that: a) the potassium carbonate is added as an aqueous solution, or b) the particle size of the potassium carbonate is comparable to the particle size of powdered sodium bicarbonate conventionally used for baking. Suitably, potassium carbonate having a sieve analysis of "100 mesh 2% by weight retained, 200 mesh 15%-45% by weight retained, 325 mesh 50% by weight minimum retained" or finer can be used. To further assure the avoidance of hot spots, the flour should be distributed substantially uniformly over the surface of the sponge and the potassium carbonate, either dry or as an aqueous solution, should be distributed substantially uniformly over the flour. Coarser potassium carbonate, as well as fine potassium carbonate, can be used by applying the potassium carbonate directly and substantially uniformly on the surface of the sponge so that the surface moisture of the sponge hydrates and solubilizes substantially all of the potassium carbonate. In this embodiment, potassium carbonate having particle sizes ranging up to about "through 20 mesh, on 80 mesh 98% by weight" can be used, for example, with substantial elimination of hot spots which are due to localized areas of excessive alkalinity.

After adding the potassium carbonate and flour to the sponge, the remaining dry ingredients are added, preferably by sieving, followed by partial mixing, and the addition of the shortening and optional water. The dough ingredients and the sponge are then mixed to obtain a dough of substantial homogeneity. After mixing, the dough is proofed, or allowed to ferment, as is conventional in the cracker art. Typical proofing times range from about 3 hours to about 5 hours, most typically about 4 hours. Generally, the temperature of the sponge before doughing, the temperature of the dough after doughing, and the temperature of the dough at the dough forming machine are substantially the same.

The proofed dough is machined and baked in conventional manner for the preparation of crackers or other sponge goods. Soda crackers, for example, are formed from a continuous sheet of dough which is laminated or lapped before being cut. The dough pieces are formed by a stamping device, such as a reciprocating cutter or rotary cutter, which does not entirely sever the individual crackers from the sheet. The crackers remain in a substantially continuous sheet through the band oven. The cutter also punctures the dough pieces to form docking holes for the prevention of uneven or excess expansion in the oven. After baking, the individual crackers are separated from the substantially continuous sheet. The optional topping salt is generally applied after stamping and before baking.

Baking is typically performed in a band oven having a perforated or mesh band. Baking temperatures and times are those conventionally used in the art. In the case of soda crackers, baking temperatures in a band oven ranging from about 250° F. to about 750° F. for a period of time of about 1.5 minutes to about 2.5 minutes are suitable.

The baked product is typically dried during the baking step or in a subsequent drying step to a moisture content of about 2% to about 4% by weight, based upon the final weight of the cracker. A topping oil, such as coconut oil, can be applied to the surface of the cracker by spraying after baking as is conventional in the art.

UNFERMENTED OR CHEMICALLY LEAVENED GOODS

In preparing unfermented crackers by the method of the present invention, the ingredients used are basically the same as when preparing fermented crackers except of course that no yeast is employed. Thus, the ingredients of the dough comprise flour, fat, shortening, water, potassium carbonate and a food grade acidic compound to effect leavening. The flour used in unfermented crackers does not generally need to be as strong as the sponge flour used in fermented crackers, although the flour used in unfermented crackers should still be moderately strong. As in fermented crackers, the fat or shortening used in unfermented crackers may be lard or a vegetable shortening. Advantageously, the dough used to prepare the fermented crackers also comprises malt.

In the method of the present invention, it has been found that unfermented crackers having desirable properties are produced by using a dough comprising, per 100 parts by weight of flour, from about 20 to about 30 parts by weight of water, from 0 to about 3 parts by weight diastatic malt, from 4 to about 20 total parts by weight of fat and shortening, and from about 0.25 to about 1.5 parts by weight of potassium carbonate. In such a dough, the use of from about 1 to about 2 parts by weight of calcium phosphate per 100 parts by weight of flour gives an appropriate pH in the baked cracker. The pH range of unfermented crackers is suitable within the range of from 6.5 to 8.0, desorably from 6.7 to 8.0, and most desirably from about 7.3 to about 7.7, since it has been found that pH's within this range produce the optimum taste.

In addition to the aforementioned ingredients, doughs used to prepare unfermented crackers of the snack type by the method of the present invention desirably contain sugar, since sugar helps to provide the taste expected in a snack cracker. The sugar is desirably added as a mixture of sucrose and high fructose corn syrup, preferred amounts of these sweetening agents being, per 100 parts by weight of flour in the dough, from about 4 to about 12 parts by weight of sucrose and from about 1 to about 5 parts by weight of high fructose corn syrup.

When producing unfermented crackers by the method of the present invention, the conventional mixing steps of a creaming stage followed by a dough-up stage may be employed. In the creaming stage, the shortening, at least part of the water and part of the flour are blended together. In the dough-up stage, the remaining flour and the potassium carbonate are added to form the final dough. To ensure uniform distribution of the potassium carbonate throughout the dough, the flour added in the dough-up stage is desirably distributed substantially uniformly over the surface of the mixture formed in the creaming stage and the potassium carbonate is thereafter distributed uniformly over the surface of the flour. Alternatively, an aqueous solution of the potassium carbonate may be added to the other ingredients of the dough.

Lamination, cutting, baking and post-baking treatment of unfermented crackers produced by the process of the present invention can be effected in the same manner as for the fermented crackers described above.

In addition to the production of low sodium unfermented crackers and low sodium sponge goods such as soda crackers, oyster or soup crackers, club crackers, cheese crackers, pretzels and the like, sweet goods such as cookies, wafers, cakes and the like, having a low or no sodium content can also be made by substituting potassium carbonate for all or part of the sodium bicarbonate in conventional formulations for these types of baked goods. Surprisingly, even though sweet goods, such as cookies and cakes, generally contain more flavoring ingredients than do soda crackers or other crackers, elimination of salt has been found to result in a substantially blander tasting product. By replacing all or substantially all, of the sodium bicarbonate with potassium carbonate, sodium reduction with minimal salt reduction is obtained. The amount of potassium carbonate used should be sufficient to result in a desired pH for the final product and to provide sufficient leavening. As with the sponge goods, the potassium carbonate can be used in an amount of from about 80% to about 90% by weight of the amount of sodium bicarbonate used in a conventional formulation to achieve a desired pH, or in larger amounts in conjunction with a food grade acidic compound.

In preparing these types of baked goods, the potassium carbonate should be added in a manner so as to avoid the occurence of hot spots due to local concentrations of the potassium carbonate. This can be accomplished by sieving the potassium carbonate substantially uniformly over the surface of the flour as in the preparation of the sponge goods of the present invention. In the preparation of cookies, for example, the sugar, water, shortening, and typical cookie flavoring and texturizing ingredients can be creamed together followed by addition of the flour. The potassium carbonate, either dry or as an aqueous solution, is then distributed substantially uniformly over the surface of the flour and then mixing is continued to produce a substantially homogeneous cookie dough. In an alternative embodiment, the potassium carbonate can be added during the creaming stage, preferably as an aqueous solution.

The process of the present invention achieves an oven spring, which is the sum of all the leavening that occurs in the oven, with potassium carbonate which is comparable to the oven spring obtained with sodium bicarbonate. If the addition of the potassium carbonate so as to achieve a desired pH and a desired sodium content does not provide the desired degree of leavening or oven spring, appropriate amounts of chemical leaveners, such as ammonium bicarbonate, can be used with the potassium carbonate.

The choice of a leavening system for a low-sodium unfermented cracker, or other unfermented or chemically leavened baked goods, involves consideration of a number of properties desired in the final cracker, including sodium content, oven spring, browning (the production of a brown color in the baked cracker), and the pH of the baked cracker. Of the acidic components available for use in chemical leavening systems, calcium phosphate monobasic is usually preferred since it not only acts as the acidic component of the leavening system but also promotes browning of the cracker. Increasing the proportion of ammonium bicarbonate in the leavening system increases oven spring, as already noted, but may affect the pH, and hence the taste, of the final product, since ammonium bicarbonate is less alkaline than potassium carbonate. Potassium carbonate tends to produce less oven spring than ammonium bicarbonate, but its more alkaline character is useful in increasing the pH of the final cracker or other unfermented or chemically leavened baked goods to within the desired range.

It has been found that unfermented crackers having a desirable combination of browning, oven spring and pH can be produced using leavening systems containing from about 1.3 to about 8, and preferably about 2.5 to about 5, parts by weight of ammonium bicarbonate monohydrate per part by weight of potassium carbonate on an anhydrous basis. Such leavening systems may contain from about 30 to about 10 (preferably about 25 to about 16) percent by weight of calcium phosphate (monobasic) or other acidic component, from about 40 to about 80 (preferably about 50 to about 70) percent by weight of ammonium carbonate and from about 30 to about 10 (preferably from about 22 to about 14) percent by weight of potassium carbonate, all percentages being based upon the total weight of the calcium phosphate, ammonium bicarbonate and potassium carbonate present and being on an anhydrous basis. A specific preferred leavening system, the use of which is illustrated in Example VII below, has an ammonium carbonate monohydrate: potassium carbonate weight ratio of 4:1 and comprises 19.5 percent by weight of calcium phosphate, monobasic, monohydrate, 64.4 percent by weight of ammonium bicarbonate monohydrate and 16.1 percent by weight of anhydrous potassium carbonate.

The amounts of such calcium phosphate/ammonium bicarbonate/potassium carbonate leavening systems needed to produce a desired degree of oven spring can be determined by routine empirical tests, as will be apparent to those skilled in the art. In general, it is preferred to employ from about 1.5 to about 3 parts by weight of the leavening system per 100 parts by weight of flour in the dough.

As noted above, because the present invention allows one to reduce the amount of sodium present in baked goods in forms other than sodium chloride, the invention permits one to obtain a given degree of salty taste in baked goods with a lower sodium content than has been possible in prior art baked goods. Crackers of the present invention, like prior art crackers, may have sodium present in the dough (dough sodium chloride) and/or as topping applied on one surface of the cracker. The proportions of the total sodium chloride in the dough and the topping affect the taste of the cracker. If all the sodium chloride is present in the dough, it is less effective in giving a salty taste to the cracker than if at least part of the sodium chloride is present in the topping. On the other hand, if all the sodium chloride is present in the topping and none in the dough, a very strong initial salty taste is imparted to the cracker, but this strong initial taste may tend to fade to a rather bland taste of the unsalted dough.

In general, it has been found that, in the case of unfermented crackers, it is desirable for sodium chloride to be added to the dough in an amount sufficient to provide at least about 20 mg. of sodium ion per 14.2 g. serving of the baked cracker (equivalent to about 0.53 parts by weight of sodium chloride per 100 parts by weight of flour in a typical cracker dough), and for sodium chloride to be present in the topping in an amount sufficient to provide at least about 25 mg. of sodium ion per 14.2 g. serving of the baked cracker. It should be noted that, if amounts of topping salt providing less than about 25 mg. of sodium ion per 14.2 g. serving of the cracker are used, difficulties may be experienced in providing a sufficiently even distribution of topping salt using conventional apparatus for the spreading of topping salt. It is especially preferred that the unfermented crackers contain, per 14.2 g. serving, at least about 25 mg. of sodium ion in the dough salt and at least about 30 mg. of sodium in the topping salt, with a total sodium ion content not in excess of about 65 mg. per serving.

In fermented crackers, on the other hand, somewhat greater amounts of sodium chloride appears to be desirable, and it has been found that good results are obtained by using sufficient sodium chloride to provide about 30 mg. of sodium ion in the dough, and about 60 mg. of sodium ion in the topping, per 14.2 g. serving of the baked cracker.

The present invention is further illustrated in the following Examples. All percentages, parts, and proportions are by weight and all temperatures are in °F. unless otherwise indicated:

EXAMPLE I

In this Example, low sodium soda crackers are produced. The ingredients used to form the sponge are:

| SPONGE INGREDIENTS | QUANTITY |
| --- | --- |
| Wheat Flour | 65 lbs. |
| Starter Solution (enzyme, previous batch starter, yeast, and water) | 10 lbs. |
| Malted Barley Flour | 14 oz. |
| Water | 20 lbs |

The sponge is formed by dumping the flour into a trough, adding the malted barley flour, the starter solution, and then the balance of the water. The ingredients are mixed until clear. At the start of the fermentation, the sponge has a temperature of about 75° to 80° F. The resulting homogeneous mixture is then proofed for about 19 hours.

The dough ingredients and their amounts for addition to the thus obtained sponge are:

| DOUGH INGREDIENTS | QUANTITY |
| --- | --- |
| Wheat Flour | 35 lbs. |
| Shortening | 7 lbs. |
| Salt | 8 oz. |
| Potassium Carbonate | 1 lb. 1 oz. |
| Calcium Carbonate | 7 oz. |

The potassium carbonate has a sieve analysis of:

| $K_2CO_3$ | WEIGHT % |
| --- | --- |
| on 40 mesh | 33.2% |
| on 50 mesh | 44.89% |
| on 60 mesh | 13.02% |
| on 80 mesh | 7.61% |
| on 100 mesh | 0.94% |
| thru 100 | 0.33% |

At the end of the fermentation period, the temperature of the sponge before doughing is about 90° to 92° F. The potassium carbonate is distributed substantially uniformly over the surface of the sponge. Then the flour, salt, and calcium carbonate are sieved individually onto the flour. As mixing of these ingredients starts, the shortening is added and mixing is continued until a substantially homogeneous dough is obtained. The temperature of the dough after doughing is about 90° F. The mixed dough is then proofed about 4 hours. The proofed dough is laminated, then cut using a rotary cutter. The temperature of the dough at the machine is about 90° F. The dough is baked in a band oven having top and bottom burners for about 2 minutes. The baked products are then sprayed with oil. Three pounds of oil are used for the batch.

The baked, final product has a moisture content of about 2.7% by weight and a pH of about 7.2. The pH of the baked good is measured by measuring the pH of a slurry obtained by crushing a sample and distributing it in distilled water to obtain a slurry which is 10% by weight solids.

The final product has a sodium content of about 31 mg. per 14.2 gram serving. The sodium content of the crackers is measured by atomic absorption.

The biscuits are 2 inches square by about 7/32 inches thick and have a stack height of about 9" per 40 crackers. The product has a substantially uniform pleasant light tan color. Dark streaks, which are evidence of potassium carbonate hot spots are not present. The product has a substantially uniform laminar cell structure throughout and a pleasant mouth feel, pleasant crispiness, and no bitter off-flavor.

EXAMPLE II

Example II is identical to Example I except that the 8 oz. of salt is applied as topping salt on the laminated dough instead of being incorporated into the dough as in Example I. The final product has a moisture content of about 3.6% by weight, a pH of about 7.1, a uniform texture and has a uniform brown color. It has a pleasant mouth feel, crispiness and no bitter off-flavor.

EXAMPLE III

The ingredients and their relative amounts used to produce low sodium arrowroot cookies are:

| INGREDIENTS | AMOUNT |
| --- | --- |
| Flour | 100 lbs. |
| Sugars | 29.5 lbs. |
| Shortening | 21 lbs. |
| Corn Syrup | 6 lbs. |
| Arrowroot Flour | 5 lbs. 8 oz. |
| Starch | 7 lbs. 8 oz. |
| Casein | 3 lbs. 12 oz. |
| Milk Powder | 6 lbs. |
| Eggs | 2 lbs. 8 oz. |
| $K_2CO_3$ | 6.0 oz. |
| Salt | 3.0 oz. |
| Ammonium Phosphate | 5 oz. |

-continued

| INGREDIENTS | AMOUNT |
|---|---|
| Potassium Acid Tartrate | 0.8 oz. |
| Water | 12 lbs. |

The potassium carbonate has a sieve analysis as indicated in Example 1.

The milk powder and ammonium phosphate are each dissolved in separate portions of the water. The shortening, sugars, arrowroot flour, starch, casein, eggs, and the milk powder solution are creamed 5 minutes at low speed. The ammonium phosphate solution and the balance of the water are added to the creamed mixture and creaming is continued for another two minutes at low speed. The corn syrup is then creamed into the resulting mixture followed by the addition of the flour substantially uniformly over the creamed mixture. The potassium carbonate is distributed substantially uniformly over the surface of the flour and then the salt and the potassium acid tartrate are added. The ingredients are mixed to obtain a substantially homogeneous dough. The dough is baked in a band oven for about 4 minutes at an average temperature of about 400° F. The oven spring, texture and taste of the baked cookie are comparable to those obtained using sodium bicarbonate instead of the potassium carbonate.

EXAMPLE IV

The same amounts of ingredients and procedure used in Example III are used to produce an arrowroot cookie except the potassium carbonate is dissolved in the balance of the water which is added to the creamed mixture of shortening, sugars, arrowroot flour, starch, casein, eggs and milk powder solution.

EXAMPLE V

In this example, low sodium soda crackers are produced. The ingredients used to form the sponge are:

| SPONGE INGREDIENTS | QUANTITY |
|---|---|
| Wheat Flour | 60 lbs. |
| Starter Solution (enzyme, previous batch starter, yeast, and water) | 10 lbs. |
| Malted Barley Flour | 14 oz. |
| Water | 20 lbs |

The sponge is formed by dumping the flour into a trough, adding the malted barley flour, the starter solution, and then the balance of the water. The ingredients are mixed until clear. At the start of the fermentation, the sponge has a temperature of about 75° to 80° F. The resulting homogeneous mixture is then proofed for about 19 hours.

The dough ingredients and their amounts for addition to the thus obtained sponge are:

| DOUGH INGREDIENTS | QUANTITY |
|---|---|
| Wheat Flour | 40 lbs. |
| Shortening | 8 lbs. |
| Salt | 9 oz. |
| Potassium Carbonate, 47% solution | 2 lb. 11 oz. |
| Calcium Carbonate | 7 oz. |

The potassium carbonate solution, sold by Diamond Shamrock Chemicals Company, Morristown, N.J. has an analysis, on a weight basis, of 47.3% $K_2CO_3$.

At the end of the fermentation period, the temperature of the sponge before doughing is about 90° to 92° F. The flour is distributed substantially uniformly over the surface of the sponge and the salt and calcium carbonate are sieved individually onto the flour. The aqueous 47% potassium carbonate is then distributed substantially uniformly over the flour by pouring it in a generally oblong path along the length of the flour-covered sponge. As mixing of these ingredients starts, the shortening is added and mixing is continued until a substantially homogeneous dough is obtained. The temperature of the dough after doughing is about 89° F. The mixed dough is then proofed about 4 hours. The proofed dough is laminated, then cut using a rotary cutter. The temperature of the dough at the machine is about 90° F. The dough is baked in a band oven having top and bottom burners for about 2 minutes. The baked products are then sprayed with oil. Three pounds of oil are used for the batch.

The baked, final product has a moisture content of about 2.4% by weight and a pH of about 7.6. The pH of the baked good is measured by measuring the pH of a slurry obtained by crushing a sample and distributing it in distilled water to obtain a slurry which is 10% by weight solids.

The final product has a sodium content of about 34.7 mg. per 14.2 gram serving. The sodium content of the crackers is measured by atomic absorption.

The biscuits are 2 inches square by about 7/32 inches thick and have a stack height of about 9" per 40 crackers. The product has a substantially uniform pleasant light tan color. Dark streaks, which are evidence of potassium carbonate hot spots are not present. The product has a substantially uniform laminar cell structure throughout and a pleasant mouth feel, pleasant crispiness, and no bitter off-flavor.

EXAMPLE VI

Example VI is identical to Example V except that the 9 oz. of salt is applied as topping salt on the laminated dough instead of being incorporated into the dough as in Example V. The final product has a moisture content of about 2.6% by weight, a pH of about 7.6, a uniform texture and has a uniform brown color. It has a pleasant mouth feel, crispiness and no bitter off-flavor. The final product has a sodium content of about 37.2 mg per 14.2 gram serving.

EXAMPLE VII

This Example illustrates the replacement of sodium bicarbonate with potassium carbonate in unfermented crackers in accordance with the method of the present invention, with a simultaneous increase in the proportion of ammonium bicarbonate in the leavening agent.

Experiments were conducted in which the proportions of calcium phosphate, ammonium bicarbonate and potassium carbonate in a dough were varied, as was the mixing technique employed. A formulation and mixing technique, which gave good oven spring were as follows:

| Ingredient | Parts by weight |
|---|---|
| Flour | 100.0 |
| Shortening | 10.0 |

| Ingredient | Parts by weight |
| --- | --- |
| Sugars | 11.0 |
| Malt | 1.25 |
| Dough salt | 0.69 |
| Ammonium bicarbonate monohydrate | 1.50 |
| Potassium carbonate (anhydrous monohydrate) | 0.38 |
| Calcium phosphate, monobasic | 0.45 |
| Water | 20.0 |

The dough was prepared by combining the shortening, sugars, malt, dough salt and part of the water in a creaming stage, adding the flour on top of the creamed mixture and sifting the calcium phosphate on top of the flour. After some mixing, the ammonium bicarbonate and potassium carbonate were added in the form of aqueous solutions, and the resultant mixed for an extended period and proofed for two hours. The resultant dough was laminated, cut 0.75 parts of topping salt per 100 parts of flour, applied and the crackers baked.

The resultant crackers had a good appearance and a proper degree of oven spring, and hence a good flaky texture. The sodium content of the crackers was 60 mg. per 14.2 g. serving.

EXAMPLE VIII

This Example illustrates the preparation of a low-sodium fermented cracker by the process of the present invention, and the effects of varying the distribution of salt between the dough and the topping in such a fermented cracker.

A sponge was prepared from the following ingredients:

| Ingredients | Parts by Weight |
| --- | --- |
| Flour | 64.46 |
| Yeast | 0.20 |
| Water | 28.0 |
| | 92.66 |

Preparation of the sponge was effected in a three spindle mixer. The flour was sieved and dumped into the trough. A suspension of the yeast in the water, (except for approximately 0.9 parts by weight of water per 100 parts by weight of flour, this water being reserved for use in dissolving the potassium carbonate, as described below) was prepared by stirring the yeast and water for at least 10 minutes. The suspension was held at 80° F. (26.7° C.) prior to use.

To prepare the sponge, an appropriate quantity of the solution thus prepared was added to the flour in the trough and resultant mixture mixed, then covered and allowed to proof for 19 hours.

Five separate batches of this sponge were prepared, and were converted into four batches of dough of the present invention and one batch of conventional, sodium bicarbonate-leavened dough. The first dough of the present invention was prepared by adding to one batch of the sponge prepared as described above the following ingredients:

| Ingredients | Parts by Weight |
| --- | --- |
| Flour | 36.0 |
| Shortening | 8.0 |
| Calcium carbonate | 0.44 |
| Anhydrous potassium carbonate | 1.0 |
| TOTAL | 45.44 |

To prepare the dough from the sponge, the potassium carbonate, dissolved in the reserved 0.9 parts by weight of water, was added on top of the sponge. The calcium carbonate was added, the trough was placed under the mixer, the blades lowered into the trough, the mixer started, and the shortening added while mixing. After mixing, the resultant dough was proofed for four hours. The proofed dough was then laminated and cut, 1.69 parts by weight of topping salt was applied from a salt spreader and the crackers baked. After baking, spray oil can be applied as a topping.

A second batch of crackers for the invention were produced in the same manner except that the weight of topping salt was reduced to 1.125 parts by weight. A third batch of crackers of the invention was prepared in the same way of the first batch, except that 0.56 parts by weight of dough salt were included per 100 parts by weight of flour (the dough salt was added to one corner of the trough, away from the potassium carbonate, before the potassium carbonate was added to the trough) and the topping salt was reduced to 1.125 parts by weight. Finally, a fourth batch of crackers of the invention were prepared in the same manner as the third batch except that only 0.56 parts by weight of dough salt and only 0.56 by parts by weight of topping salt were used for each 100 parts by weight of flour.

A batch of control crackers were prepared by omitting the potassium carbonate from the dough ingredients and substituting 1.25 parts by weight of sodium bicarbonate per 100 parts by weight of flour. The control crackers used 1.25 parts by weight of dough salt and 2.5 parts by weight of topping salt per 100 parts by weight of flour.

The first and third batches of crackers of the invention had sodium contents of 90 mg. per 14.2 g. serving while the second and fourth batches of crackers of the invention had sodium contents of 60 mg. per serving. The control crackers had a sodium content, as determined empirically, of approximately 180 mg. per 14.2 g. per serving. It was found that the first batch of crackers of the invention, in which all the salt was in the form of topping salt, had a less salty taste than the control crackers, while the second and forth batches of crackers of the invention tended to have a stronger after taste than the control crackers. The third batch of crackers of the invention, in which ⅓ of the salt was present as dough salt and ⅔ as topping salt, provided a taste which was found to be substantially the same as that of the control crackers even though they contained only half as much total sodium.

It will be apparent to those skilled in the art that numerous changes and modifications can be made in the preferred embodiments of the invention described above without departing from the scope of the invention. Accordingly, the whole of the foregoing description is to be construed in an illustrative and not in a limitative sense, the scope of the invention being defined solely by the appended claims.

What is claimed is:

1. A crisp cracker baked from a laminated dough composition comprising flour, water, fat or shortening, a leavening agent comprising potassium carbonate and an added acidic component selected from the group consisting of fumaric acid and monobasic calcium phosphate in an amount of about 10% to about 50% by weight of the potassium carbonate, and sodium chloride, the cracker having sodium chloride present as a topping on one of its surfaces, at least about 85 percent by weight of the sodium in the cracker, including the topping, being present as sodium chloride wherein said cracker has a sodium content of less than or equal to 140 mg Na+ per 14.2 gm serving and has a pH of about 6.5 to about 8.0, said cracker having a substantially uniform laminar cell structure.

2. A cracker according to claim 1 wherein at least about 90 percent by weight of the sodium in the cracker, including the topping, is present as sodium chloride.

3. A cracker according to claim 2 wherein at least about 95 percent by weight of the sodium in the cracker, including the topping, is present as sodium chloride.

4. A cracker according to claim 1 wherein the amount of sodium chloride in the dough is sufficient to provide at least about 20 mg. of sodium ion per 14.2 mg. serving of the cracker.

5. A cracker according to claim 1 wherein the amount of sodium chloride in the topping is sufficient to provide at least about 25 mg. of sodium ion per 14.2 g. serving of the cracker.

6. A cracker according to claim 5 which comprises at least about 25 mg. of sodium ion in the form of sodium chloride in the baked dough, and at least about 30 mg. of sodium ion in the form of sodium chloride in the topping, per 14.2 g. serving of the cracker, the total sodium ion content of the cracker being not more than about 65 mg. per 14.2 mg. serving of the cracker.

7. In a method for preparing a baked crisp cracker good comprising forming a dough by admixing dough ingredients comprising flour, water, fat or shortening and sodium bicarbonate, laminating the dough and baking the dough, the improvement comprising substituting at least a portion of the sodium bicarbonate with potassium carbonate and an acidic compound selected from the group consisting of fumaric acid and monobasic calcium phosphate to such an extent that the sodium content of the baked good is less than or equal to 140 mg Na+ per 14.2 gm serving, substantially all of the sodium content being from sodium chloride, the weight of the potassium carbonate used being sufficient to produce a baked good having a pH in the range of about 6.5 to about 8.0 and wherein said baked good has a substantially uniform cell structure and wherein said acidic compound is present in the amount of about 10% to about 50% by weight of the potassium carbonate.

8. A method according to claim 7 wherein the weight of potassium carbonate used is sufficient to produce a baked good having a pH in the range of about 6.7 to about 8.0.

9. A method according to claim 7 wherein the weight of potassium carbonate used is from about 80 to about 90 percent by weight of the sodium bicarbonate it replaces.

10. A method according to claim 7 wherein the weight of potassium carbonate used is in excess of about 90 percent by weight of the sodium bicarbonate it replaces and a food grade acidic compound is added to the dough to reduce the pH of the baked dough to within the range of about 6.7 to about 8.0.

11. A method according to claim 7 wherein the weight of potassium carbonate is approximately 100 percent by weight of the sodium bicarbonate it replaces.

12. A method according to claim 7 wherein said dough ingredients include sodium chloride and substantially all of the sodium content is derived from the sodium chloride.

13. A method according to claim 7 wherein the cracker is of an unfermented type and wherein ammonium bicarbonate is added to the dough.

14. A method according to claim 13 wherein from about 1.3 to about 8 parts by weight of ammonium bicarbonate are added to the dough per part by weight of potassium carbonate on an anhydrous basis.

15. A method according to claim 14 wherein the dough is leavened with a leavening system comprising from about 40 to about 80 percent by weight of ammonium bicarbonate, from about 30 to about 10 percent by weight of potassium carbonate and from about 30 to about 10 percent by weight of an edible acidic component capable of reacting with the potassium carbonate to liberate carbon dioxide, all percentages being based upon the total weight of the potassium carbonate, ammonium bicarbonate and acidic component.

16. A method according to claim 15 wherein the acidic component comprises calcium phosphate monobasic.

17. A method according to claim 16 wherein the leavening system comprises from about 25 to about 16 percent by weight of calcium phosphate, from about 50 to about 70 percent by weight of ammonium bicarbonate and from about 22 to about 14 percent by weight of potassium carbonate, the percentages being based upon the total weight of the ammonium bicarbonate, potassium carbonate and calcium phosphate on an anhydrous basis.

18. A method according to claim 16 wherein the leavening system is added to the dough in an amount of from about 1.5 to about 3 parts by weight per 100 parts by weight of flour in the dough.

19. A method according to claim 7 wherein the cracker is prepared by blending the shortening, at least part of the water and part of the flour in a creaming stage, and thereafter adding to the mixture formed in the creaming stage the remaining flour and potassium carbonate to form the finished dough.

20. A method according to claim 19 wherein the remaining flour is distributed substantially uniformly over the surface of the mixture formed in the creaming stage and the potassium carbonate is distributed substantially uniformly over the surface of the flour, the potassium carbonate having a particle size distribution of about 98 percent by weight finer than 100 U.S. mesh.

21. A method according to claim 19 wherein the dough is laminated prior to baking.

22. A method according to claim 19 wherein the potassium carbonate is added to the dough in the form of an aqueous solution.

23. A method according to claim 22 wherein the baked good is a soda cracker.

24. A method according to claim 19 wherein the baked good is a soda cracker.

25. A method according to claim 24 wherein the dough comprises, per 100 parts by weight of flour, from about 20 to about 30 parts by weight of water, from 0 to about 3 parts by weight diastatic malt, from 4 to about 20 total parts by weight of fat and shortening, and from about 0.75 to about 1.5 parts by weight of potassium carbonate.

26. A method according to claim 7 wherein the baked good is an unfermented cracker and wherein the dough further comprises, per 100 parts by weight of flour, from about 4 to about 12 parts by weight of sucrose and from about 1 to about 5 parts by weight of high fructose corn syrup.

27. A method according to claim 26 wherein the dough further comprises, per 100 parts by weight of flour, from about 0.25 to about 2 parts by weight of calcium phosphate monobasic.

28. A method according to claim 7 wherein the potassium carbonate has a particle size distribution of about 98 percent by weight larger than about 80 U.S. mesh.

29. A method according to claim 7 wherein all of the sodium bicarbonate is replaced with potassium carbonate.

30. A method for making a cracker comprising:
  a. preparing a sponge by a process comprising mixing sponge ingredients comprising flour, water, and yeast and fermenting the mixture to produce leavening acids,
  b. forming a dough by a process comprising admixing the sponge with dough ingredients comprising flour and a leavening system comprising potassium carbonate for reaction with said leavening acids produced from fermenting the sponge so as to form a craker dough, the addition of the potassium carbonate being effected by adding the potassium carbonate to the dough in the form of an aqueous solution so as to avoid localized concentrations of potassium carbonate, the amount of potassium carbonate added being sufficient to obtain a pH of about 7.0 to about 8.0 by neutralizing acids produced during said fermentation and to leaven the dough, and
  c. baking the dough to produce a cracker.

31. The method of claim 30 wherein the leavening system for the dough consists essentially of potassium carbonate and said produced leavening acids.

32. The method of claim 30 wherein said dough is laminated.

33. In a method for production of a crisp cracker comprising:
  a. preparing a sponge by a process comprising mixing sponge ingredients comprising flour, water and yeast and fermenting the mixture to produce leavening acids;
  b. forming a dough by a process comprising admixing dough ingredients comprising flour, a leavening system consisting essentially of sodium bicarbonate, and at least one of water and shortening with said sponge, thereby forming a dough;
  c. laminating the dough; and
  d. baking the laminated dough, the improvement comprising replacing said sodium bicarbonate with a leavening amount of potassium carbonate so that substantially all of the cracker is contributed by sodium chloride and the sodium content of the cracker is reduced.

34. A method for making a crisp cracker as claimed in claim 33 wherein the sodium content of the cracker is reduced to less than or equal to 35 mg $Na^+$ per 14.2 gm serving.

35. A method for making a cracker comprising:
  a. preparing a sponge by a process comprising mixing sponge ingredients comprising flour, water, and yeast and fermenting the mixture to produce leavening acids,
  b. forming a dough by a process comprising admixing the sponge with dough ingredients comprising flour and a leavening system consisting essentially of potassium carbonate for reaction with said leavening acids formed during the fermentation step so as to form a cracker dough, the amount of potassium carbonate added being sufficient to obtain a pH of about 7.0 to about 8.0 by neutralizing said leavening acids produced during said fermentation and to leaven the dough,
  c. laminating the dough; and
  d. baking the dough to produce a cracker having a reduced sodium content, in which process sodium chloride is added to the dough before baking, said sodium chloride being admixed with the dough as dough salt, added as topping salt, or both such that at least about 80 percent by weight of the sodium in the cracker is present in the form of sodium chloride.

* * * * *